Sept. 15, 1970   L. J. FISCHER   3,528,246
FAN ARRANGEMENT FOR HIGH BYPASS RATIO TURBOFAN ENGINE
Filed Dec. 29, 1966   3 Sheets-Sheet 2
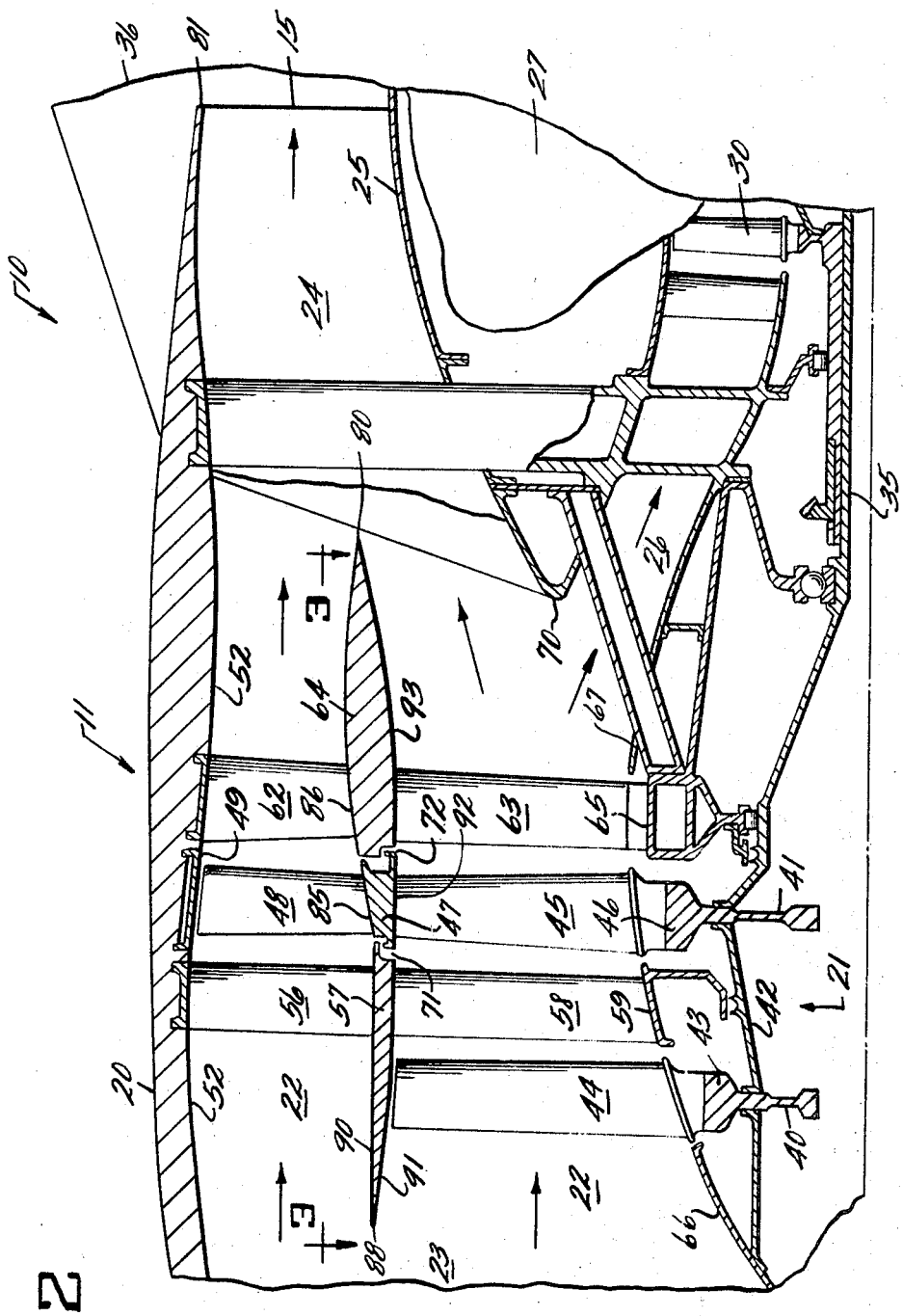
INVENTOR.
LEE J. FISCHER
BY HELEN M. FISCHER,
EXECUTRIX
George R. Powers
ATTORNEY

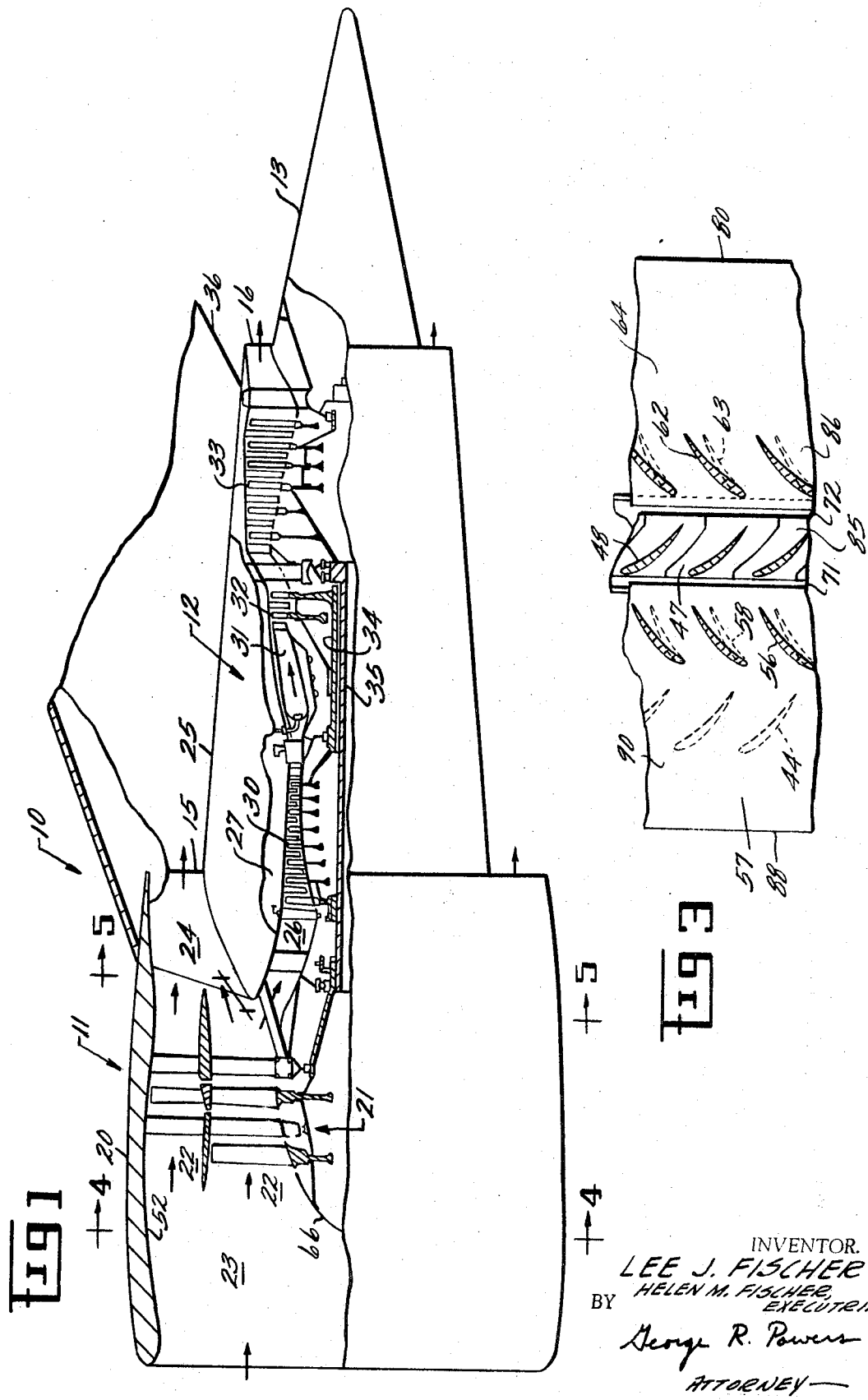

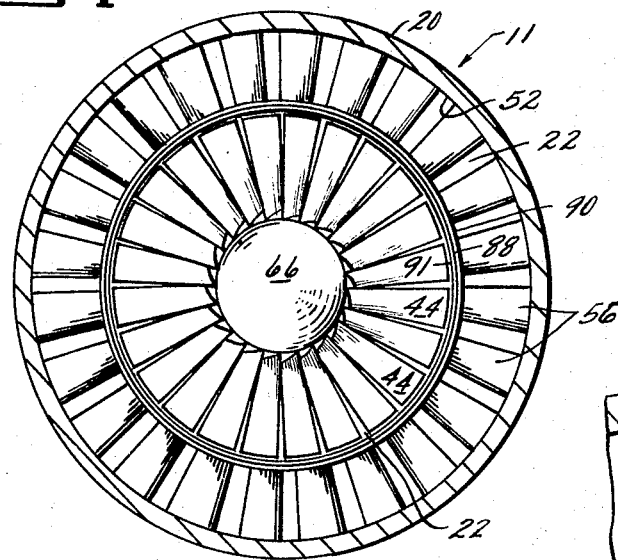
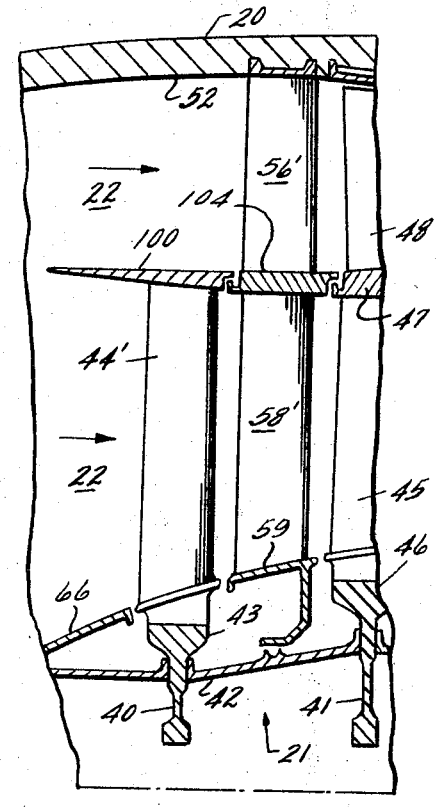
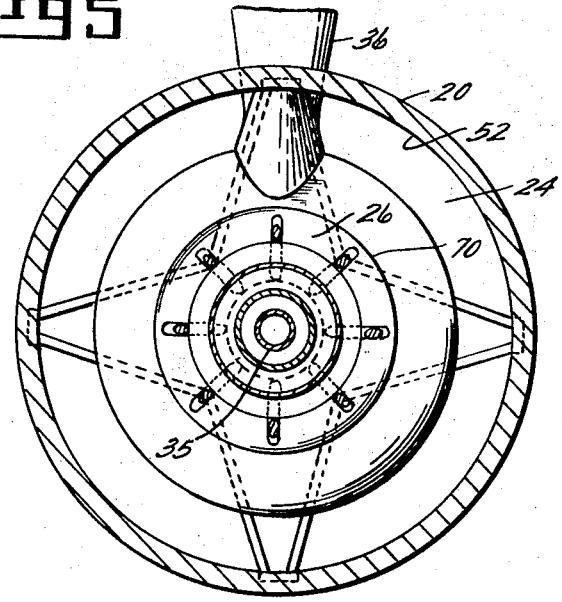

United States Patent Office 3,528,246
Patented Sept. 15, 1970

3,528,246
FAN ARRANGEMENT FOR HIGH BYPASS RATIO TURBOFAN ENGINE
Lee J. Fischer, deceased, late of Marblehead, Mass., by Helen M. Fischer, executrix, Marblehead, Mass., assignor to General Electric Company, a corporation of New York
Continuation-in-part of application Ser. No. 416,681, Dec. 2, 1964. This application Dec. 29, 1966, Ser. No. 605,932
Int. Cl. F02k 3/02
U.S. Cl. 60—226     10 Claims

ABSTRACT OF THE DISCLOSURE

An axial flow compressor or fan for a turbofan engine having two axially spaced rows of rotor blades housed in an annular casing and supported by a rotor hub. One row of blades extends radially from the hub only a portion of the distance between the hub and the casing while the other row of blades is comprised of an inner tier of blades, which extends radially from the hub to a shroud, and an outer tier of blades extending from the shroud to the casing. A row of stator vanes having a portion intermediate the spaced rows of blades is supported by the casing. A second row of stator vanes supported by the casing may be provided downstream of the rows of blades. Means are provided to divide the passage formed between the hub and the casing into an inner annulus where the fluid is subjected to two stages of compression and an outer annulus where the fluid is subjected to a single stage of compression. Such means may comprise one or more rotating annular members carried by the rotor blades and one or more stationary annular members carried by the stator vanes. The shroud means and casing are preferably contoured to smoothly transition the fluid flow and to minimize the axial slope of the tips of the outer tier of blades.

---

This application is a continuation-in-part of a copending, but now abandoned application entitled, Turbofan Type Engine, Ser. No. 416,681, filed Dec. 2, 1964, in the name of Lee J. Fischer and assigned to the assignee of this invention.

This invention relates to axial flow compressors and fans for turbofan engines and, more particularly, to a fan arrangement providing economical and effective operation at high bypass ratios.

A "turbofan" engine is basically a "turbojet" engine to which a fan, or low pressure compressor, has been added. In such engines, a part of the energy developed by the turbojet portion of the engine is utilized to drive the fan, which bypasses at least a portion of its flow around the turbojet portion of the engine and discharges the bypassed air through a nozzle. The gross propulsive thrust, or force, produced by a turbofan engine is thus comprised of two components, the force produced by bypass air flowing through the fan and discharged therefrom to the atmosphere and the force produced by hot gases flowing through the turbojet portion of the engine and discharged therefrom to the atmosphere. In theory, it is well known that the specific fuel consumption of such an engine is related to the bypass ratio, "specific fuel consumption" being the pounds of fuel per hour required to produce a pound of thrust and "bypass ratio" being the mass ratio of pounds of bypass air discharged directly to atmosphere from the fan to pounds of exhaust products flowing through the turbojet nozzle. In theory, specific fuel consumption should be improved by increasing the bypass ratio. This does not always occur in practice, however, since the bypass ratio is but one of many engine parameters having a significant effect on specific and total fuel consumption.

For a variety of aerodynamic and mechanical reasons, it is not an easy matter in practice to provide turbofan engines capable of operating economically and effectively at high bypass ratios, such as 5.0 to 1 or more as compared to conventional bypass ratios of 2.0 to 1 or less. In this respect, it will be appreciated that there is a direct correlation between bypass ratio and the required flow area within the fan. Heretofore, efforts to provide suitable flow areas for high bypass engines have resulted in correspondingly large fan diameters and, consequently, frontal areas. Since the aerodynamic drag of an engine installed in an aircraft is a function of frontal area, it will be appreciated that increases in bypass ratio are normally accompanied by increases in drag, which act against gross engine thrust to effectively reduce specific fuel consumption. Furthermore, increases in engine size are normally accompanied by even more rapid increases in weight, which in turn require greater thrust and possibly more total fuel than would be required by a lighter weight and smaller engines having more modest bypass ratios. In other words, aerodynamic drag and engine weight are significant engine parameters which commonly change along with bypass ratio and tend to counteract the theoretical fuel economy advantages of high bypass engines.

With the required flow area through the fan portion of a turbofan engine being essentially the difference between the total frontal area and the projected area of the fan rotor hub, it would appear that aerodynamic drag and engine weight could be reduced significantly by making the diameter of the rotor hub quite small relative to the diameter of the fan blading and by using long span blades having short chords—that is, by providing a low hub-to-tip ratio and high aspect ratio blading.

This basic approach is, however, subject to certain aerodynamic and mechanical problems. For example, aerodynamic considerations require that the tip portions of the rotor blades be relatively closely spaced circumferentially if reasonable efficiency is to be achieved. If, however, suitable spacing is provided at the tips of high aspect ratio blades having a low hub-to-tip ratio, the circumferential spacing between the hub portions of the blades will be inadequate. Inadequate hub spacing causes substantial flow blockage, unless the angle of attack is inefficiently high, and extreme difficulty in physically attaching a large number of blades to the very little circumferential space available on a small rotor hub. It has also been found that high aspect ratio blades having a low hub-to-tip ratio tend to vibrate excessively and possibly fail unless adequately restrained by suitable mid-span supporting means such as shrouds. Such supporting arrangements, however, usually introduce undesirable aerodynamic flow losses and increase the overall weight of the engine. Furthermore, overall pressure rise capability of an axial flow compressor or bypass fan is normally limited by the capabilities of the hub area. This is particularly true in fans having a low hub-to-tip radius since the tip portions of the rotor blades travel at a much greater tangential speed than the hub portions. Because of this, it has been found that the tip portions of a typical stage of blading are capable of producing a pressure rise approximately twice that of the hub portions.

In view of the foregoing considerations, among others, previous attempts to provide high bypass ratio turbofan engines have embodied numerous aerodynamic and mechanical compromises. Typically, such arrangements have accepted inadequate efficiency and fuel economy due to excessive spacing at the blade tips, inadequate spacing at the hub portions, and additional flow blockage from mid-span stiffening means. In addition the pressure rise capabilities of such machines have been limited for the most part by the aerodynamic capabilities of the highly loaded hub portions of the blading, the tip portions being lightly loaded.

It is therefore an object of this invention to provide an improved turbofan engine having a high bypass ratio.

Another object of this invention is to provide a high bypass ratio turbofan engine capable of achieving economical and effective operation, including relatively low specific fuel consumption.

Yet another object is to provide a high bypass ratio turbofan engine in which the theoretical advantages of the high bypass ratio are not overcome by increased aerodynamic drag and engine weight.

A further object of this invention is to provide an axial flow compressor or fan in which frontal area and weight are effectively minimized without generating substantial aerodynamic and mechanical problems.

A still further object of this invention is to provide an axial flow compressor of low hub-to-tip radius ratio in which substantially all blading is performing at or close to full capacity.

Briefly stated, in carrying out the invention in one form, an axial flow compressor particularly adapted for use in a high bypass ratio turbofan engine includes an annular flow passage formed between a casing and a rotor hub coaxially mounted therein, the flow passage being divided by suitable means into an inner annulus and an outer annulus. First and second axially spaced-apart rows of rotor blade means are mounted on the rotor hub, the first row projecting radially therefrom across only the inner annulus and the second row projecting radially across substantially the entire radial extent of the main flow passage. In other words, air flowing through the outer annulus is subjected to only one stage of compression while the air flowing through the inner annulus is subjected to two stages of compression. Since the first row of rotor blade means extends across only about one-half of the main flow passage, the arrangement of this invention may be characterized as being a "one and one-half" stage axial flow compressor with a supercharging half stage. By utilizing two stages of compression in the inner annulus to one stage in the outer annulus, the tip portions of the second row of rotor blade means may operate at substantially their full capability since a similar pressure rise can be generated by the two stages also operating at full capacity in the inner annulus.

By a further aspect of the invention, the first row of rotor blade means includes a single tier of circumferentially spaced rotor blades, and the second row of rotor blade means includes an inner tier of blades, an annular ring interconnecting the ends of the blades of the inner tier, and an outer tier of blades mounted on the annular ring. Rows of stator blade means having similar annular rings or stator members separating inner and outer blades are located upstream and downstream of the second row of rotor blade means, the motor and stator rings cooperating to form at least a portion of the means dividing the main passage into the inner and outer annuli. In addition, the rings contribute significantly to rigidity of the blading and thus permit the use of higher aspect ratio blading than would otherwise be permissible.

By still further aspects of the invention, a turbofan engine including a bypass fan as described above further includes a core engine disposed within a nacelle downstream of the fan, the core engine receiving a portion of the air compressed by the fan. More particularly, the fan casing overlaps the upstream portion of the nacelle to form therewith an annular and preferably converging bypass passage bypassing the core engine, the bypass passage communicating with both the outer annulus and the inner annulus. The upstream end of the nacelle of the core engine is located radially inward of the downstream end of the means dividing the main passage into the inner and outer annuli such that fan air is supplied to the core engine from the inner annulus only. The means dividing the main passage into the inner and outer annuli is contoured to deliver compressed air to the bypass passage and the core engine in a highly efficient and substantially loss-free manner.

While the novel featrues of the invention are set forth with particularity in the appended claims, the invention, both as to organization and content, will be better understood and appreciated, along with other objects and features thereof, from the following detailed description when taken in conjunction with the drawings, in which:

FIG. 1 is a view partially in cross-section of a turbofan engine having a high bypass ratio fan incorporating the present invention;

FIG. 2 is an enlarged and more detailed cross-sectional view of the fans portion of the turbofan engine of FIG. 1;

FIG. 3 is a view taken along line 3—3 of FIG. 2;

FIG. 4 is a view taken along line 4—4 of FIG. 1;

FIG. 5 is a view taken along line 5—5 of FIG. 1; and

FIG. 6 is a view of a modified shroud arrangement for the first row of rotor blades.

Referring now to the drawings, and particularly to FIG. 1, a high bypass ratio turbofan engine constructed in accordance with the present invention is indicated generally by the numeral 10. The engine 10 includes a low pressure axial flow compressor or fan 11, a core engine 12, and a plug 13. Briefly stated, the entire supply of air to the engine 10 flows through the fan 11 and is then divided into two portions, a bypass portion which is discharged through an exhaust nozzle 15 and a combustion supporting portion which flows through the core engine 12 before being discharged through an exhaust nozzle 16. Since the engine 10 is a high bypass ratio machine, it will be appreciated that the mass of air discharged through the exhaust nozzle 15 is substantially greater than that passing through the core engine 12 and the exhaust nozzle 16, preferably 5 to 10 times as great.

With reference now to FIGS. 1–5, the fan 11 has a generally cylindrical casing 20 coaxially surrounding a composite rotor hub 21 to form therewith a main annular passage 22 communicating with an inlet plenum 23 formed within the upstream portion of the casing 20. The annular passage 22 also communicates at its downstream end with an annular bypass passage 24 terminating in the nozzle 15 formed between the downstream portion of the casing 20 and the upstream portion of a nacelle 25 circumferentially surrounding and supporting the core engine 12 and with an inlet passage 26 formed inwardly of the nacelle 25 and leading to the core engine 12. It will be noted that the upstream portion of the nacelle 25 diverges in the downstream direction to give the bypass passage 24 a converging flow area terminating in the minimum area throat or nozzle 15. In addition to providing a converging flow area, the nacelle 25 has formed therein between the bypass passage 24 and the core engine 12 an annular chamber 27 in which various controls and accessories may be conveniently mounted. The core engine 12 includes a high pressure axial flow compressor 30, an annular combustor 31, a high pressure turbine 32, and a low pressure turbine 33 disposed in serial flow relationship between the inlet passage 26 and the exhaust passage 16. A hollow shaft 34 axially interconnects the high pressure turbine 32 and the high pressure compressor 30 for transmitting power therebetweeen, and an inner shaft 35 axially interconnects the low pressure turbine 33 and the rotor hub 21 for transmitting power therebetween. The inner shaft 35 is coaxially disposed within the shaft 34. In operation, air is compressed in the high pressure compressor 30 and then supplied to the combustor 31 where fuel is burned to provide high energy combustion gases for driving the turbines 32 and 33 and, consequently, the high pressure compressor 30 and the fan 11. After driving the turbines, the hot exhaust products are discharged through the annular, converging exhaust passage 16 defined between the downstream portion of the nacelle 25 and the upstream portion of the plug 13. The motive fluid flowing through the core engine and discharged through the exhaust passage 16 thus produces one component of thrust on the engine 10 and an airframe to which it may be attached through a pylon 36.

Reference is now made to FIGS. 2–4 for a more detailed description of the preferred configuration of the low pressure compressor or fan 11. The composite rotor hub 21 includes first and second axially spaced-apart rotor wheels 40 and 41, respectively, interconnected by a generally cylindrical spacer 42, the rim portion 43 of the upstream wheel 40 supporting a plurality of circumferentially spaced-apart compressor blades 44 which extend radially outward thereof across substantially half the radial extent of the main annular passage 22. A similar plurality of circumferentially spaced-apart blades 45 are mounted on the rim portion 46 of the downstream wheel 41, each of the blades 45 having a platform 47 mounted on the tip thereof. Each platform 47 supports in turn a radial compressor blade 48 which extends outwardly therefrom across the remainder of the annular passage 22 into proximity to a shroud 49 mounted in the casing 20, the adjacent platforms 47 abutting to form a continuous annular ring separating the inner tier of blades 45 from the outer tier of the circumferentially spaced-apart blades 48. Stationary rows of blading are disposed immediately upstream and downstream of the row of rotor blading mounted on the second wheel 41, i.e., the row of rotor blading including the blades 45 and 48 and the annular ring formed by the platforms 47. The upstream row of stator blading includes a plurality of circumferentially spaced-apart vanes 56 secured to the inner surface 52 of the casing 20 and projecting radially inward therefrom across a radial portion of the passage 22, the inner tips of the vanes 56 supporting an annular ring or stator member 57 in radial alignment with the annular ring formed by the platforms 47. Another plurality of stator vanes 58 are secured to the stator member 57 and extend radially therefrom across the inner portion of the passage 22 to a continuous shroud 59 which both ties together the inner tips of the blades 58 and forms a portion of the inner boundary of the passage 22. The downstream row of stator blading similarly comprises an outer tier of circumferentially spaced-apart stator vanes 62 and an inner tier of stator vanes 63 separated by an annular ring or stator member 64. The ring 64 is also in general radial alignment with the platforms 47. The inner tips of the stator vanes 63 are interconnected by a continuous shroud 65 which, as the shroud 59, forms a portion of the inner boundary of the passage 22. At this point, it will be appreciated that the main annular passage 22 is formed between the inner surface 52 of the casing 20 and a composite inner surface formed by a bulletnose fairing 66 secured to the upstream side of the rotor wheel 40, the shrouds 59 and 65, and the peripheral surfaces of the wheel rims 43 and 46 intermediate adjacent blades 44 and 45, respectively. A stationary wall member 67 is secured to the shroud 65 and extends downstream therefrom to form the inner surface of the annular inlet passage 26 to the core engine 12.

Still referring to FIGS. 2–4 the annular stator member 57 extends upstream from the vanes 56 and 58 in closely spaced relationship to the outer tips of the blades 44 to provide shrouding for the blades, and the stator member 64 extends substantially downstream of the vanes 62 and 63 into axially overlapping relationship with the upstream portion of the nacelle 25. In this respect, it will be noted that the upstream end 70 of the nacelle 25 is of substantially smaller diameter than the stator member 64. Suitable sealing arrangements 71 and 72 are provided between the stator member 57 and the annular ring formed by platforms 47 and between the stator member 64 and the annular ring, respectively, such that the annular ring formed by the platforms 47 and stator members 57 and 64 form an annular wall dividing the main annular passage 22 into an inner annulus and an outer annulus. Thus, air flowing through the annular passage 22 is divided into two discrete parts, the portion flowing through the outer annulus being subjected to one stage of compression by the blades 48 and the vanes 56 and 62 and the portion flowing through the inner annulus being subjected to two stages of compression by the blades 44 and 45 and the vanes 58 and 63.

With the stator member 64 coaxially overlapping the upstream portion of the nacelle 25, its downstream end 80 being located axially intermediate the upstream end 70 of the nacelle 25 and the downstream end 81 of the casing 20, the total flow of air in the outer annulus is supplied to the converging, annular bypass passage 24 along with a substantial portion of the flow of air in the inner annulus. Only a portion of the total flow within the inner annulus is supplied to the inlet passage 26 leading to the core engine 12. During normal operation, the bypass ratio of air flowing through the bypass passage 24 to that supplied to the inlet passage 26 of the core engine is preferably in the range of 5/1 to 10/1. Since, however, the upstream end 70 of the nacelle 25 acts as an aerodynamic flow divider, the bypass ratio can and does vary from this nominal range under certain conditions. For example, when an aircraft is descending with reduced power, the high pressure compressor 30 is able to accept substantially less air and the bypass ratio may rise to as much as 25/1. The spaced relationship of the upstream end 70 of the nacelle 25 from the blades 63 prevents, or at least minimizes any "stall" condition in the fan and likewise prevents or at least minimizes any separation of the air boundary layer along the nacelle surface.

In addition to forming the annular wall dividing the main annular passage 22 into the inner annulus and the outer annulus, the annular rotor ring and the stator members 57 and 64 serve other important functions. To produce the required pressure rise, it is essential that the flow areas of the inner annulus and the outer annulus converge in the downstream direction. For the outer annulus, the outer surfaces 85 and 86 of the annular ring formed by the platforms 47 and the stator member 64 diverge from the engine centerline rather rapidly in the downstream direction to a point downstream of the blades 62 and 63 such that the required axial variation in flow area is produced without excessive inward slope on the inner surface 52 of the casing 20. By avoiding excessive slope on the casing surface 52 and, consequently, on the tips of the blades 48, certain mechanical problems associated with tip clearances, including undesired leakage and rubbing, are largely eliminated since slight axial displacements of the blades 48 do not produce large changes in tip clearance.

The elements comprising the annular wall are aerodynamically contoured to deliver fluid flowing through the main annular passage 22 to the bypass passage 24 and the inlet passage 26 in an efficient and substantially loss-free manner. In this respect, it will be noted that the upstream end 88 of the annular stator member 57 is extremely thin and is thus capable of dividing the air stream without introducing significant losses due to flow blockage as in the case of conventional mid-span supporting means, including shrouds as typically known and used in the art. The outer surfaces 90, 85, and 86 of the stator member 57, the annular rotor ring and the stator member 64, respectively, and the corresponding inner surfaces 91, 92 and 93, downstream of the upstream edge 88 are contoured as described above to provide proper flow path convergence within the outer and inner annuli. Thus, although the annular rotor ring formed by the platforms 47 and the rotor member 64 have substantial radial thickness, those skilled in the art will appreciate that this thickness resulting from proper orientation of the wall surfaces promotes effective fluid flow in the annuli. The downstream end of the stator member 64 is, of course, aerodynamically contoured to discharge fluid from the inner and outer annuli with minimum exit losses. Furthermore, even though the annular rotor ring and the stator members 57 and 64 are not mid-span shrouds in the sense of prior art devices since they do not block normal flow, they do permit the use of lightweight blading since no individual blades extend the entire distance between the rotor hub 21 and the casing 20. Consequently, the blades utilized can have relatively short chords without introducing vibration difficulties. Thus, if tiered pairs of blade rows, such as rotor blades 45 and 48 and stator blades 56 and 58, are considered as being single rows of blading rather than tiered rows of blading, it can be seen that the present invention permits the use of extremely high aspect ratio blading.

Thus, the annular wall of the present invention splits the fluid flow so as to permit two stages of compression in the inner annulus to only one stage of compression in the outer annulus, the same pressure rise being produced in both annuli. Since the rotor blades 44 extend across only about half of the passage 22, however, the weight of blading can be less than in prior art arrangements in which all blading extends across the entire flow passage. Furthermore, the invention permits the use of a smaller diameter hub 21 than prior art arrangements and, accordingly, smaller frontal area, less aerodynamic drag and lighter weight.

Other benefits are provided by the unusual design of the fan 11. For example, due to the low tip speed of the blades 44, there is no need to provide inlet guide vanes forward of the blades 44 in order to avoid excessive relative Mach numbers. This of course also contributes to light weight. Also, there is no need to provide any anti-icing for the blades 44 since the pressure rise across the blades is sufficient to keep ice from forming. Because of the higher tip speed of the blades 48, it is preferable that the stator blades 56 be provided and, since there is no pressure rise across the blades 56, that anti-icing be provided. The motive fluid required to anti-ice only the blades 56 is much less than that which would be required to heat blades extending completely across the main annular passage.

Many obvious modifications will, of course, occur to those skilled in the art. For example, in the preferred embodiment illustrated by FIGS. 1–5, the annular shroud means for the outer tips of the first row of rotor blades 44 is an upstream extension of the annular stator member 57. If desired, however, an entirely separate shroud 100 could be mounted on the outer tips of blades 44' in the manner illustrated by FIG. 6. A suitable sealing means would then be provided between the separate shroud means 100 and an annular stator member 104 interconnecting stator blades 56' and 58', but not having an upstream extension. Similarly, if extremely low weight is desired, the downstream row of stator blading could be eliminated in the practice of the invention with, however, significant deterioration in other performance characteristics.

From the foregoing, it will be appreciated that the present invention provides an improved high bypass ratio turbofan engine capable of economical and effective operation, including relatively low specific fuel consumption. Additionally, the fan arrangement of this invention provides minimum frontal area and weight without generating substantial aerodynamic and mechanical problems.

It will be understood that the invention is not limited to the specific details of construction and arrangement of the embodiment illustrated and described herein since changes and modifications such as those discussed above will be obvious to those skilled in the art. It is therefore intended to cover in the appended claims all such changes and modifications which may occur to those skilled in the art without departing from the true spirit and scope of the invention.

What is claimed as new and is desired to secure by Letters Patent of the United States is:

1. In a turbofan gas turbine engine, an axial flow compressor comprising:
   rotor hub means mounted for rotation about an axis,
   a casing coaxially surrounding said rotor hub means and forming therewith a main annular passage,
   first and second axially spaced-apart circumferential rows of rotor blade means mounted on said rotor hub means,
   said first row of rotor blade means comprising a single tier of circumferentially spaced rotor blades projecting radially from said rotor hub means across a radial portion only of said main annular passage and an annular shroud means circumferentially surrounding the radially outer ends of said blades,
   said second row of rotor blade means comprising an inner tier of circumferentially spaced rotor blades projecting radially from said rotor hub means across a radial portion of said main annular passage, an annular ring interconnecting the radially outer ends of the blades of said inner tier, and an outer tier of circumferentially spaced rotor blades mounted on said annular ring and projecting radially therefrom across the remaining radial portion of said main annular passage,
   a circumferential row of stator blade means, said row of stator blade means comprising an inner tier of circumferentially spaced stator vanes extending across a radial portion only of said main annular passage between said first and second rows of rotor blade means, an outer tier of circumferentially spaced stator vanes extending across the remaining radial portion of said main annular passage, and an annular member interconnecting the radially outer ends of the blades of said inner tier and the radially inner ends of the blades of said outer tier,
   said annular shroud means, said annular stator member, and said annular ring being radially and axially aligned to form a substantially continuous annular wall dividing said main annular passage into an inner annulus and an outer annulus,
   whereby fluid flowing through said inner annulus is subjected to two stages of compression and fluid flowing through said outer annulus is subjected to a single stage of compression.

2. Axial flow apparatus as defined by claim 1 in which said first row of rotor blade means is located axially upstream of said second row of rotor blade means relative to the normal direction of fluid flow within said main annular passage.

3. Axial flow apparatus as defined by claim 2 including a supplementary row of stator blade means axially disposed downstream of said second row of rotor blade means,
   said supplementary row of stator blade means comprising an inner tier of circumferentially spaced stator vanes extending across a radial portion only of said main annular passage, an outer tier of circumferentially spaced stator vanes extending across the remaining radial portion of said main annular passage, and an annular member interconnecting the radially outer ends of the blades of said inner tier and the radially inner ends of the blades of said outer tier,
   said annular member of said supplementary row of stator blade means forming a downstream extension of the annular wall dividing said main annular passage into an inner annulus and an outer annulus.

4. A turbofan engine comprising:
   an axial flow compressor as defined by claim 3,
   a core engine for driving said axial flow compressor located coaxially downstream of said supplementary row of stator blade means,
   a nacelle circumferentially surrounding and supporting said core engine, the downstream portion of the casing of said axial flow compressor axially overlapping the upstream portion of said nacelle in spaced relationship therewith to form therebetween an annular passage bypassing said core engine, and said nacelle forming at least in part an inlet passage to said core engine inwardly of said bypass passage, the upstream end of said nacelle having a diameter substantially less than that of said annular wall dividing said main annular passage into an inner annulus and an outer annulus, whereby all fluid flowing through said outer annulus and a substantial portion of fluid flowing through said inner annulus is supplied to said bypass passage and a portion only of fluid flowing through said inner annulus is supplied to said inlet passage and said core engine.

5. A turbofan engine as defined by claim 4 in which the annular member of said supplementary row of stator blade means extends substantially downstream thereof into axially overlapping relationship with the upstream portion of said nacelle, the downstream end of said annular member being located axially and radially intermediate the upstream end of said nacelle and the downstream end of the casing of said axial flow compressor.

6. A turbofan engine as defined by claim 5 in which the flow area of said annular bypass passage converges in the downstream direction, said convergence resulting at least in part from relatively rapid divergence in the downstream direction of the outer surface of the upstream portion of said nacelle relative to the engine axis.

7. A turbofan engine as defined by claim 6 in which the flow area of said outer annulus of said main annular passage converges in the downstream direction, the outer surfaces of said annular ring of said second row of rotor blade means and said annular member of said supplementary row of stator blade means diverging in the downstream direction to form at least in part the converging flow area of said outer annulus.

8. A turbofan engine as defined by claim 7 in which said annular ring of said second row of rotor blade means and said annular member of said supplementary row of stator blade means are aerodynamically contoured to deliver fluid flowing through said main annular passage to said bypass passage and said inlet passage to said core engine in an efficient and substantially loss-free manner.

9. In a turbofan-type fluid flow machine: an axial flow compressor comprising, a first rotor wheel having a plurality of rotor blades mounted at the periphery thereof, a second rotor wheel downstream of said first wheel having a plurality of inner rotor blade means mounted at the periphery thereof, abutting platform portions on the tips of said inner rotor blade means forming a rotating annular member, and a plurality of outer rotor blade means projecting radially from the outer surface of said rotating member, and stator means including a casing coaxial with and surrounding said rotor wheels and forming a main annular passage in cooperation with said rotor wheels for fluid flow through the compressor and an exhaust nozzle opening at the downstream end of said casing, a first plurality of stator vanes extending radially inwardly of said casing and having a portion intermediate the first and second rotor wheels, and a second plurality of stator vanes extending radially inwardly of said casing immediately downstream of said second rotor wheel; and means dividing said main annular fluid flow passage into an inner annulus and outer annulus, said flow dividing means including a stationary annular member affixed to each of said first and second plurality of stator vanes in the radial location of said rotating member so as to form fore and aft continuations thereof, wherein the blades of said first rotor wheel and said inner rotor blade means of said second rotor wheel extend radially across said inner annulus only, and said outer rotor blade means of said second rotor wheel project radially across said outer annulus only, with the outer surface of said flow dividing means and the inner surface of said casing being convergently contoured in the downstream direction relative to each other to a point downstream of said outer rotor blade means and upstream of said exhaust nozzle opening, to thereby smoothly transition the fluid flow therebetween to the exhaust nozzle opening, and with the axial slope of said outer surface of said flow dividing means being greater than the axial slope of the inner surface of said casing in the vicinity of said outer rotor blade means to thereby minimize the axial slope of the tip portions of said outer rotor blade means.

10. In a turbofan-type fluid flow machine: an axial flow compressor comprising, a first rotor wheel having a plurality of rotor blades mounted at the periphery thereof and abutting platform portions on the tips of said rotor blades forming a first rotating annular member, a second rotor wheel downstream of said first wheel having a plurality of inner rotor blade means mounted at the periphery thereof, abutting platform portions on the tips of said inner rotor blade means forming a second rotating annular member, and a plurality of outer rotor blade means projecting radially from the outer surface of said rotating member, and stator means including a casing coaxial with and surrounding said rotor wheels and forming a main annular passage in cooperation with said rotor wheels for fluid flow through the compressor, a first plurality of stator vanes extending radially inwardly of said casing and having a portion intermediate the first and second rotor wheels, and a second plurality of stator vanes extending radially inwardly of said casing immediately downstream of said second rotor wheel; and means dividing said main annular fluid flow passage into an inner annulus and outer annulus, said flow dividing means including a stationary annular member affixed to each of said first and second plurality of stator vanes in the radial location of said rotating members so as to form fore and aft continuations thereof, wherein the blades of said first rotor wheel and said inner rotor blade means of said second rotor wheel extend radially across said inner annulus only, and said outer rotor blade means of said second rotor wheel project radially across said outer annulus only.

References Cited

UNITED STATES PATENTS 3,279,181  10/1966  Beavers et al. _____ 60—226

FOREIGN PATENTS 586,566  3/1947  Great Britain.

SAMUEL FEINBERG, Primary Examiner

U.S. Cl. X.R.

230—122; 415—79